United States Patent [19]  
Klotz et al.

[11] Patent Number: 4,913,978  
[45] Date of Patent: Apr. 3, 1990

[54] METALLIZED TEXTILE WEB AND METHOD OF PRODUCING THE SAME

[76] Inventors: Dietmar Klotz, Biebricher Allee 31, 6200 Wiesbaden; Alban Puetz, Hellgasse 10, 5456 Rheinbrohl, both of Fed. Rep. of Germany

[21] Appl. No.: 179,383

[22] Filed: Apr. 8, 1988

[30] Foreign Application Priority Data

Apr. 10, 1987 [DE] Fed. Rep. of Germany ....... 3712192

[51] Int. Cl.$^4$ ............................................. B22F 3/00
[52] U.S. Cl. ..................................... 428/551; 428/263; 428/195; 428/176; 428/111; 250/516.1
[58] Field of Search ............... 428/263, 551, 195, 111, 428/176; 250/516.1

[56] References Cited

U.S. PATENT DOCUMENTS

| | | | |
|---|---|---|---|
| 4,312,913 | 1/1982 | Rheaume | 428/263 |
| 4,435,465 | 3/1984 | Ebneth et al. | 428/195 |
| 4,467,005 | 8/1984 | Pusch et al. | 428/111 |
| 4,572,960 | 2/1986 | Ebneth et al. | 250/516.1 |
| 4,645,704 | 2/1987 | Hellwig | 428/176 |
| 4,681,591 | 7/1987 | Okayasu et al. | 428/263 |

*Primary Examiner*—Stephen J. Lechert, Jr.
*Assistant Examiner*—Nina Bhat
*Attorney, Agent, or Firm*—Michael J. Striker

[57] ABSTRACT

A metallized textile web includes a homogeneous metal layer on the textile web and is as flexible as the textile web itself, wherein the textile web itself can be composed of glass fibers, synthetic resin fibers, carbon fibers, etc., and the composite metallized textile web is suitable for wallpaper-like metallic lining of a space. The metallized textile web provides a material which forms an electronically impermeable Faraday's cage and at the same time is elastic and vibration- and displacement-secure so as to provide electronic release of respective structures. A first metal layer is applied by spraying of a rod metal melted in electric arc to form spider-like microscopic metallic parts on a workpiece, and then a second metal layer is applied by spraying of metal powder melted in a gas flame for forming ball-shaped or droplet-shaped particles, so that the "spider legs" of the spider-like metal particles engage in one another and provide an elastically flexible metal cover while the metal balls seal them and provide electronically impermeable structure.

15 Claims, 2 Drawing Sheets

METALLIZED TEXTILE WEB AND METHOD OF PRODUCING THE SAME

BACKGROUND OF THE INVENTION

The present invention relates to a metallized textile web and a method of producing the same.

The term "textile web" is used to identify a piece of fabric which has a length considerably greater than a width and can be rolled to form a textile roll so that pieces of desired length can be then cut from the textile roll. The present invention deals with a textile web provided with a metal lining which adheres to the textile web and has the flexibility corresponding to that of the fabric.

Such metallized textile webs are known in the art. The German documents DE-PS 17 04 785 and DE-OS 24 13 225 describe processes of producing the metallized textile webs through an intermediate carrier which practically operates as a pressure element and presses a thin metal layer onto a running "unendless" synthetic plastic foil. The metal layer is applied on the intermediate carrier by evaporation in vacuum or by galvanic deposition. Both references deal with small plastic bands for packaging. The metallized bands serve primarily for advertising and gift purposes, or for decorating of party spaces, such as garlands, etc. The adherence of the metal layer is pressure adherence and therefore is low also on a foil. It is questionable whether such metallic adherence on a fabric is possible and reliable.

Metallization of textiles is in principle known and disclosed for example in the German documents DE-OS 26 59 625 and DE-PS 31 27 505. The first mentioned document discloses the metallization of a cut textile piece with an electrochemical process. Then the metallized textile piece together with other non-metallized textile pieces of the same cut are soaked with synthetic resin and compressed to a stack for preventing breaking or tearing the rigid metal layer during bending. The thus produced composite serves primarily for printed circuits.

The German document DE-PS 31 27 505 discloses spraying of the metal in a known manner in melted condition by means of a spraying gun, directly onto a cut textile piece. This piece, similarly to the above-explained process, is assembled together with other equal non-metallized textile pieces to form a stack, and then soaked with polymerizable synthetic resin. The stack is pressed in a heated forming tool to the desired shape, and the synthetic resin is simultaneously polymerized. The applicant of this reference is the aviation firm Dassault-Breguet Aviation, therefore the object of this proposal is to produce airplane parts.

SUMMARY OF THE INVENTION

It is an object of the present invention to provide a metallized textile web which is suitable for lining a space at its all sides similarly to wallpapers and to provide a Faraday's cage which is impermeable for electronic pulses. This object is of urgent and paramount importance of our times since the highly developed electronic technique is used all military, financial and industrial areas and can cause considerable damage by its electronic pulses.

The present invention deals also with a metallized textile web which can be used for lining a curved surfaces and provides for the possibility of lining such surfaces in cost-favorable manner with a metallic coating, for example on a boat hull. For this purpose the metallic lining must as flexible as the fabric which carries it.

The objects of the invention cannot be solved with the proposals in the cited state of art. The pressed metal layers on foil in accordance with the German document DE-PS 17 04 785 and DE-OS 24 13 225 obviously cannot produce reliable electronic protection of the foil material. Moreover, it is questionable whether the described pressing processes can be effective on textiles, in addition to the fact that it is questionable whether a pressure for such wide textile webs as the articles in question can be considered as permissable.

Also the metallized textile pieces in accordance with the German documents DE-OS 26 59 625 and DE-PS 31 27 505 cannot solve the problems which are solved by the present invention. In accordance with their teaching, the product is rigid and as a result of a pressing process produces a three-dimensional design. For lining of a space to provide a Faraday's cage, they are not suitable since they first must be cut and moreover since the direct adhesion of sprayed metal on the fabric is doubtful. Since in the references the multi-layer stack is produced, it can be easily torn during each vibration or higher temperature differences especially on the abutment lines.

Electron-protective Faraday cages are known in the art for reliably preventing a breakthrough of electronic pulses. However, they are expensive. American electron-protected spaces are known in which walls, ceilings and floors are coated with copper plates which are soldered or welded with one another. Soldering or welding processes which are produced on situ are very difficult since the smallest non-uniformity can form a point for slipping an electronic pulse through it. After finishing the lining, measurements must be taken to determine whether it is tight or not, and where eventual untightness is located. Moreover, the rigid sheet lining is susceptible to vibrations and displacements of walls, ceilings and floor. Such displacements can occur as a result of higher temperature differences. When the lining is untight, certain measures must be taken to locate the untightness.

It has been proposed to provide an expensive lining by spraying a molten metal by a spraying gun on the walls and the like. However, with the use of the teaching of the German document DE-PS 21 42 474 when the wall surfaces are preliminarily provided with a glue layer, the sprayed layer remains susceptible to vibrations and displacements of the walls and the like, and the danger of cracks in the metal layer is higher than in the compact sheet plates.

As explained hereinabove, the present invention has an object of producing a metallized textile web which can be formed as elastic and three-dimensional as the respective textile.

In accordance with the invention during melting of rod metal in an electric arc and spraying this metal on a workpiece, the sprayed microscopic particles have the design of stars or spiders, while the particles which are applied then from a metal powder molten in a gas flame form microscopic droplets. When the particles are sprayed in an oxygen-free or low oxygen atmosphere, they do not oxidize and sinter. They maintain their full electrical conductivity, and the "fingers" of the spider-shaped particles maintain their elasticity. The "spider fingers" engage with one another and form an elastic metal coating, and then the droplet-shaped particles close the gaps. The thus formed composite is an elastic and at the same time electronically tight metal layer.

The preliminary applied adhesive agent layers protect the textile fibers from the heat of the spraying flame and connect the metal cover unseparably with the textile web. Their composition is based in principle on the approved adhesive agent disclosed in the German reference DE-OS 33 04 073.

Accurate spraying of the molten metal in an atmosphere which has as low oxygen as possible, and with uniform layer thickness is of decisive importance for the invention. Not only the elasticity and breaking resistance of the metal cover depends on it, but also the electrical conductivity of the structure. With the use of inexpensive metals such as for example Fe, even low surface oxidation leads to a considerable reduction of the electrical conductivity (optimal electrical conductivity of Fe is $=10$ m/$\Omega$mm$^2$).

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

A textile web in accordance with the exemplary embodiment is woven in a known manner from weft fibers 1 and warp fibers 2. The textile material can be glass fibers or synthetic plastic fibers, as well as cotton, carbon fibers and the like.

Figure 1:
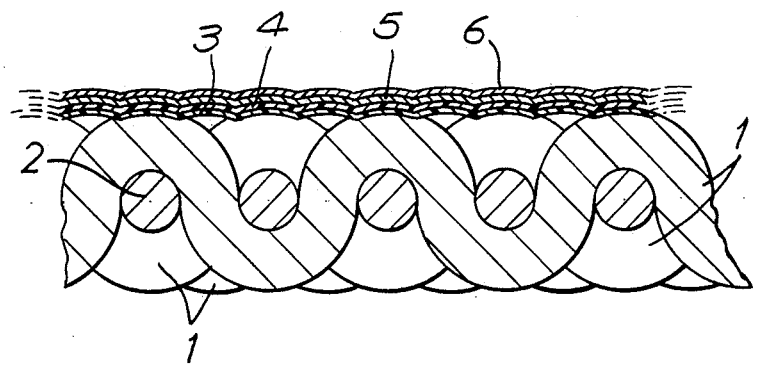
FIG. 1 is a view showing a section of a strip of textile web, on an enlarged scale, with a triple impregnating layer which penetrates into a textile material and includes two layers which are sprayed in two different spraying processes, in a systematic and stylized showing.

A water-resistant elastic adhesive agent 3 is first applied on the textile web as shown in FIG. 1. The adhesive agent 3 has the following ingredients:

| latex (Dinova-latex paint of the Didier-Werken, Niederdollendorf, West Germany) | 35 weight % |
|---|---|
| water (softened) | 23 weight % |
| powdered quartz | 23 weight % |
| water-soluble polyvinylchloride | 9 weight % |
| acrylic resin (Hoechst, West Germany) | 7 weight % |
| hydrosol (an aqueous dispersion of acrylic acid and monostyrene) | 2 weight % |
| alkyd resin lacquer (linseed oil and polyalcohol) | 1 weight % |

A water-soluble adhesive agent layer 4 is applied on the water resistant adhesive agent layer 3 and has the following ingredients:

| softened water | 34 weight % |
|---|---|
| powdered quartz | 33 weight % |
| sugar solution (sugar and water with equal weight) | 14 weight % |
| water soluble polyvinylchloride | 9 weight % |
| glue (wallpaper glue, Henkel & Cie, FRG) | 7 weight % |
| metal powder (Ni) | 3 weight % |

The water-soluble adhesive agent layer 4 has a thickness which approximately is double the thickness of the water resistant adhesive agent layer 3. Together they have a thickness of approximately 40 $\mu$m. Both layers 3 and 4 partially penetrate into the textile fabric as shown in FIG. 1.

Figure 2:
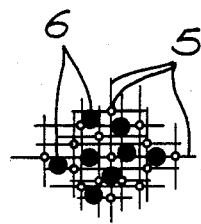
FIG. 2 is a view schematically showing an enlarged microscopically small partial section of a metal coating, in the phase after spraying of spider-shaped metal particles and at the beginning of spraying of droplet-shaped particles.

After drying of the adhesive agent layers 3 and 4, a sprayed metal layer 5 of an electrically well-conductive metal such as Cu, Al or Ag is applied. When the requirements to the conductivity are lower, also Fe can be used. The microscopic individual particles of the metal layer 5 must be star-shaped or spider-shaped as shown in FIG. 2. Individual particles of this construction can be made by spraying of molten metal by means of a spraying gun with an electric arc device.

The above described procedure cannot be however implemented very easily for producing suitable metal layers in the sense of the present invention, since the oxygen-containing atmospheric air oxidates on the way and at least partially sinters the metal droplets. They become correspondingly rigid and brittle and the conductivity reduces. Because of the brittleness the "rays" of the star-shaped or spider-shaped particles break and the required flexibility of the whole metal lining is not achieved.

The required elasticity of the interengaging "rays" of the particles is insured in that the spraying of metal is performed in a low oxygen atmosphere, for example in a device disclosed in the German document DE-OS 32 33 925 or in a device in accordance with the German document DE-GM 86 21 949.9.

A metal layer 6 is applied on the metal layer 5 and composed of the same metal. The microscopic individual particles of the metal layer 6 must be ball-shaped or droplet-shaped, as can be seen in FIG. 2. This shape can be achieved in that metal is brought in powder form in a gas flame for melting and sprayed with a spraying gun. Despite the fact that here an oxidation and partial sintering is less important for the flexibility of the whole metal lining, the reduction of the conductivity of the metal connected therewith plays a role. It is therefore required that the spraying process be here also performed in an oxygen-free atmosphere, as described hereinabove.

The adhesive agent layers 3, 4 have first the object of protecting the textile fibers from the heat of the spraying flame and preventing penetration of the sprayed metal particles into the textile fibers. On the other hand, they must guarantee reliable adherence of the metal lining on the textile web (see also the prior art such as DE-PS 21 42 474, DE-OS 32 33 925 and DE-OS 33 04 073).

The metal layers 5, 6 form a coherent metal lining which overlies the whole textile web. This metal lining has a total thickness up to between 100 and 150 $\mu$m which has the same flexibility as a glass fiber-textile web with a thickness of 1 mm. With thicker textile webs, the thickness of the metal lining can amount to 200 $\mu$m. The embedding of the adhesive agent layers 3, 4 is almost total, whereas the metal layers 5, 6 are only partly integrated in the textile web is total.

The flexibility and simultaneous uniformity of the metal lining 5, 6 is achieved by the interconnection of the star-shaped or spider-shaped individual metal particles with one another. The "rays" or "fingers" of the microscopic particles of the metal layer 5 engage one another and produce with one another the flexible metal lining 5. The ball-shaped or droplet-shaped particles of the metal layers 6 fill the intermediate spaces between the "rays" of the metal layer 5 and overlay the layer 5. Both metal layers 5, 6 form in practice a single layer, since the ball-shaped or droplet-shaped particles fill the intermediate spaces of the star-shaped particles. Therefore the ball-shaped or droplet-shaped particles seal electronically the whole metal lining, without affecting the flexibility of the lining. The size of the particles is adjustable, ranging between 30 and 200 m.

Figure 3:
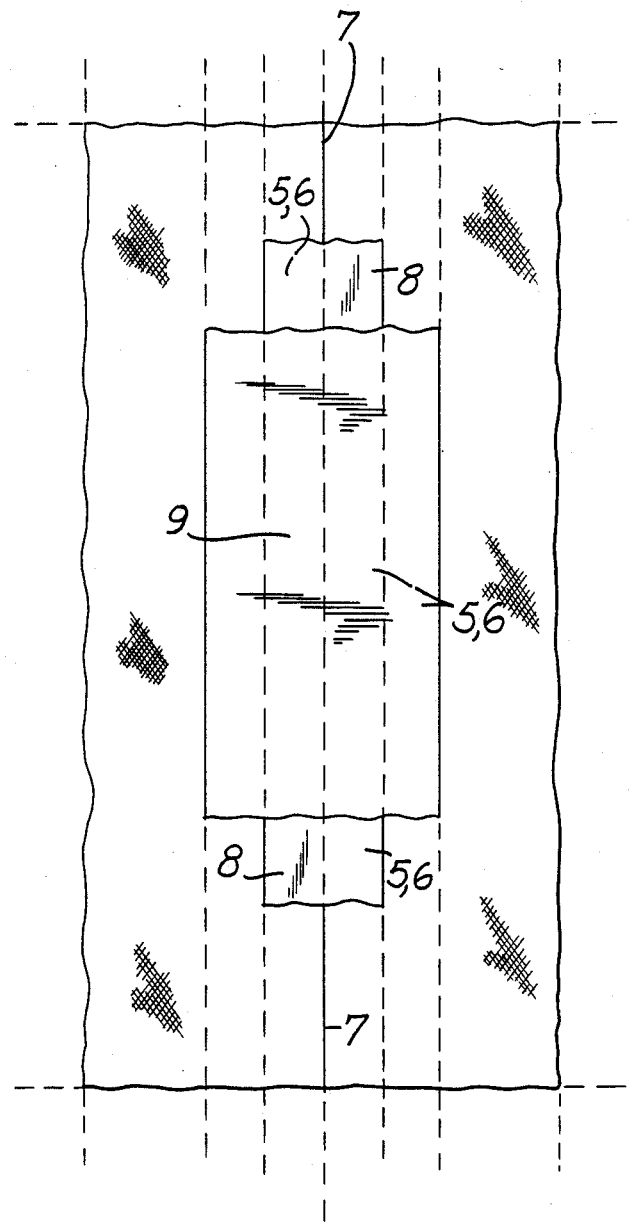
FIG. 3 is a partial view of the lining of a wall with the inventive textile web and respective sealing strips.

As explained in the beginning of the description, it is one of the greatest technical requirements of our time to protect electronic data equipment, computer centers, data transmitting and information transmitting devices from breaking in of electronic pulses from outside. This is especially true for the military sector, as well as for banks and for certain areas of the industry, for example in the area of research and development. For the first time the present invention opens a path to reliably electronically protect dangerous spaces with an economically acceptable cost, in that they are coated with metallized textile webs in accordance with the present invention in a wallpaper-like manner and therefore produce a Faraday's cage which is impermeable for electrical pulses. The abutting edges of the textile webs are bridged so that each abutting edge 7 as shown in FIG. 3 is provided with a small textile strip 8 which is glued on it and metallized at both sides in accordance with the invention. A metallized textile strip 9 is glued on the textile strip 8 with its metallized side against the smaller strip 8. The textile strip 9 is approximately two times wider than the textile strip 8. For its gluing, a commercial contact glue can be used. The gluing process can be performed under pressure. The conductivity of the metallized surfaces which lie over one another remains over the contact surfaces. On doors and windows the structure is electronically sealed in accordance with the same principle, however, there the wider textile strip 9 is metallized at both sides.

The flexibility of the inventive textile web with the mechanical inseparability of the metal layers 5, 6 from the textile substrate and with sheet-like uniformity of the metal surface opens many other possibilities of its use, and not only of the exceptional importance of it for the electronic screening. Some of the examples of such use is the lining of a ship hull with copper for preventing growing of algae and the like on the hull parts which lie under the water line.

Copper linings are expensive and have the disadvantage that they increase the weight of the ship with respective negative influence on the speed and maneuverability which is especially important for sport yachts. The applying of the inventive copper-coated textile webs on the ship hill provides a relatively lightweight copper shell with a cost which is considerably lower than the cost of a conventional copper lining. Especially favorable for the use of inventive textile webs as copper lining of ship hulls, an elastic adhesive, preferably polyurethane adhesive (e.g. RODOL, Bruehl, FRG) is sprayed upon the non-metallized side of the textile web. This adhesive penetrates the textile web until it meets the metal layer and forms an additional firm connexion between the metal layer and the textile.

It will be understood that each of the elements described above, or two or more together, may also find a useful application in other types of constructions differing from the types described above.

While the invention has been illustrated and described as embodied in a metallized textile web, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A metallized textile web comprising a textile web having a web surface; a first polymer adhesive agent layer applied on said web surface of said textile web and composed of a dried latex enriched with powdered quartz, acrylic acid and alkyd resin; a second adhesive agent layer applied on said first adhesive agent layer and composed of a dried water dispersion of powdered quartz and sugar; a first metal layer applied on said second adhesive agent layer and composed of a metal in form of spider-shaped microscopical individual particles; and a second metal layer applied on said first metal layer and composed of the same metal in form of ball-shaped or droplet-shaped microscopic particles.

2. A metallized textile web as defined in claim 1, wherein the metal of said metal layers is selected from the group consisting of copper, aluminum, silver and iron.

3. A metallized textile web as defined in claim 1, wherein said first adhesive agent layer is a water-resistant layer and includes the following ingredients:

| latex | 35 weight % |
|---|---|
| water | 23 weight % |
| powdered quartz | 23 weight % |
| water-soluble polyvinylchloride | 9 weight % |
| acrylic acid | 7 weight % |
| hydrosol | 2 weight % |
| alkyd resin lacquer | 1 weight %. |

4. A metallized textile web as defined in claim 3, wherein said latex is a fine dispersion of a polymer, said water being softened water, said hydrosol being an aqueous dispersion of acrylic acid and monostyrene, and said alkyd resin lacquer being linseed oil and polyalcohol.

5. A metallized textile web as defined in claim 1, wherein said second adhesive agent layer is a water-soluble adhesive agent layer and composed of the following ingredients:

| relieved water | 35 weight % |
|---|---|
| powdered quartz | 33 weight % |
| sugar solution | 13 weight % |
| water soluble polyvinylchloride | 9 weight % |
| glue | 7 weight % |

| metal powder | 3 weight %. |
|---|---|

6. A metallized textile web as defined in claim 5, wherein said water is a softened water, said sugar solution being sugar and water in equal weight, said glue being wallpaper glue, said metal powder being nickel powder.

7. A method of producing a metallized textile web, the method comprising the steps of providing a textile web having a web surface; applying on the web surface a first polymer adhesive agent layer composed of dried latex enriched with powdered quartz, acrylic acid and alkyd resin; applying on said first adhesive agent layer a second adhesive agent layer composed of dried water dispersion of powdered quartz and sugar; applying on said second adhesive agent layer a first metal layer composed of a metal in form of spider-shaped microscopic individual particles; and finally applying on said first metal layer a second metal layer composed of the same metal in form of ball-shaped or droplet-shaped microscopic particles.

8. A method as defined in claim 7, wherein said steps of applying the metal layers includes applying the metal layer composed of the metal selected from the group consisting of copper, aluminum, silver and iron.

9. A method as defined in claim 7, wherein said step of applying the first adhesive agent layer includes applying the first adhesive agent layer in form of a water resistant layer with the following ingredients:

| latex | 35 weight % |
|---|---|
| water | 23 weight % |
| powdered quartz | 23 weight % |
| water-soluble polyvinylchloride | 9 weight % |
| acrylic acid | 7 weight % |
| hydrosol | 2 weight % |
| alkyd resin lacquer | 1 weight %. |

10. A method as defined in claim 9, wherein said step of applying the second adhesive agent layer includes applying the first adhesive agent layer in which the latex is a fine dispersion of a polymer, water is softened water, the hydrosol is an aqueous dispersion of acrylic acid and monostyrene, and the alkyd resin lacquer is linseed oil and polyalcohol.

11. A method as defined in claim 7, wherein said step of applying the second adhesive agent layer includes applying the adhesive agent layer as a water-soluble layer with the following ingredients:

| relieved water | 35 weight % |
|---|---|
| powdered quartz | 33 weight % |
| sugar solution | 13 weight % |
| water soluble polyvinylchloride | 9 weight % |
| glue | 7 weight % |
| metal powder | 3 weight %. |

12. A method as defined in claim 11, wherein said step of applying the second adhesive agent layer includes applying the second adhesive agent layer in which the water is softened water, the sugar solution is sugar and water with equal weight, the glue is wallpaper glue, and the metal powder is nickel powder.

13. A method as defined in claim 7, wherein said steps of applying the adhesive agent layers include first applying the adhesive agent layers and then drying the adhesive agent layers, said step of applying the first metal layer including applying the first metal layer after the drying of the adhesive agent layers and by spraying the metal of a metal wire melted in electric arc without oxygen, by means of a spraying gun.

14. A method as defined in claim 13, wherein said step of applying the second metal layer includes applying the metal in form of metal powder by a spraying gun in gas flame.

15. A method of producing a metallized textile web as defined in claim 7, comprising the step of subsequently spraying an adhesive upon the non-metallized side of the textile web.

* * * * *